UNITED STATES PATENT OFFICE.

WOOLSEY McALPINE JOHNSON, OF HARTFORD, CONNECTICUT, ASSIGNOR TO THE CONTINUOUS ZINC FURNACE COMPANY, OF HARTFORD, CONNECTICUT, A CORPORATION OF CONNECTICUT.

TREATMENT OF COPPER-NICKEL PYRRHOTITE.

1,238,298. Specification of Letters Patent. Patented Aug. 28, 1917.

No Drawing. Application filed October 22, 1913. Serial No. 796,568.

*To all whom it may concern:*

Be it known that I, WOOLSEY McA. JOHNSON, a citizen of the United States, residing at Hartford, in the county of Hartford and State of Connecticut, have invented certain new and useful Improvements in Treatment of Copper-Nickel Pyrrhotite, of which the following is a full, clear, and exact description, such as will enable others skilled in the art to which it appertains to make and use the same.

This invention deals with an improved method of obtaining the valuable constituents from ores which have offered considerable difficulty under such metallurgical treatments as have hitherto been available. Certain of the commercially more important characteristics of this invention prominently appear in its utilization for the reduction of copper-nickel pyrrhotite ores containing approximately 2% Cu, 4% Ni, 45% Fe, 38% S, .10 oz. to .05 oz. Pt, Pd, and Ag, and therefore it will suffice to disclose this invention by way of a detailed description of the proposed treatment of this typical ore.

One object within the contemplation of this invention is to render available a process composed of a number of essentially practical steps so selected, devised and interrelated as to constitute a commercially economical system admirably adapted for the treatment of ores of the type represented.

Another object is to formulate a novel method whereby the valuable metals may be obtained at a reasonable expense from products rich in sulfur and other elements, as for example: a matte containing approximately 95% Ni$_2$S; 2% Na$_2$S; ½% Cu$_2$S; 1% Co$_2$S; 5% FeS, and .15 oz. of Ag, Pt, and Pd.

The invention accordingly consists in the several steps and the relation and order of one or more of such steps with relation to each of the others thereof, which will be exemplified in the hereinafter disclosed process, and the scope of the application of which will be indicated in the following claims.

Continuing now by way of a more detailed description of the preferred illustrative embodiment of this invention, it will be assumed that the ore to be treated is a nickel-copper pyrrhotite, constituted somewhat as follows: 45% Fe; 38% S; 4% Ni; 2% Cu; from 0.10 oz. to 0.05 oz. Pt plus Pd plus Ag; and the balance gangue. As a preliminary step, this ore will be subjected to the well known treatment of "heap-roasting" to reduce the sulfur, and then worked up by blast-furnace smelting and converting to the so-called "80%" matte" which is approximately represented by 52% Ni; 26% Cu; 19% S; 1% Co; 1% Fe, and the balance gangue.

The next step will consist in cupola-smelting 80% matte with from 40% to 50% crude Na$_2$SO$_4$ and a large excess of coke under strongly reducing conditions so as to produce a reduction of the sodium sulfate yielding sodium sulfid which dissolves the copper sulfid and enables the so called "top-bottoms" separation to be made. The reduction is assumed to take place in accordance with this equation:

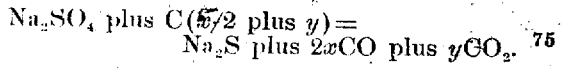

The "tops" carry a large percentage of the copper (70% to 80%) and the "bottoms" a large percentage of the nickel. This is repeated two or three times, the tops from the second or third smelting being run into the furnaces giving the first and second treatments respectively, finally yielding a product composed as follows: 95% Ni$_2$S; 2% Na$_2$S; 1.5% Cu$_2$S; 1% Co$_2$S; ½% FeS, and .15 oz. of Ag plus Pt plus Pd.

The "tops" resulting from the foregoing treatment are smelted for copper by regular and well known methods.

The rich complex nickel-bearing matte resulting from the cupola-smelting is crushed or otherwise brought into granular form and subjected to the action of chlorin gas at a temperature of from 225° C. to 275° C., suitable receptacles being used. The metals will be changed from sulfur compounds into chlorids, and the sulfur will be volatilized in the form of SCl$_2$, which may be condensed by means of water in a coke tower.

By leaching the residue from the chloridizing receptacle, the various valuable metals will be brought into solution as chlorids of Ni, Co, Cu, Fe, Pd, Pt, and Na. Such silver chlorid as may remain undissolved with the matte residue may if desired be recovered by usual methods, though ores or products of the general character of that herein detailed seldom contain enough silver to warrant its recovery. The metals other than Ni, Fe and Co may then be removed from the solution of chlorids in various equivalent ways; for example; (a) by electrolysis, using an insoluble anode, in a 1% acid solution; (b) precipitation by $H_2S$ or $Na_2S$ in an acid solution; (c) cementation on metallic nickel; but preferably by cementation on scrap iron. The Cu, Pt, and Pd are thus obtained in a condition such that their further isolation is exceedingly easy, and may be worked up according to known methods or sold to a copper refinery.

The resultant solution now contains Ni, Co, and Fe as chlorids and may be freed from the latter two by treating with bleaching powder and $Na_2CO_3$ or by chlorin gas and NaOH or $Na_2CO_3$. The cobalt and iron will thereupon be precipitated as hydrates—$Co_2(OH)_6$ and $Fe_2(OH)_6$—and may be separated by first dissolving these hydrates and carefully precipitating the iron by analytically exact amounts of bleaching powder and $Na_2CO_3$ or chlorin gas and NaOH.

The solution of $NiCl_2$ obtained by the above is contaminated only by NaCl and preferably will be treated by evaporation and crystallization to fused $NiCl_2$. This is then placed in a retort and while at a full red heat is subjected to the action of water gas or other source of hydrogen, and thereby reduced to metallic nickel; the reduction being promoted if desired by mixing with powdered coal. The reduction is simple and takes place as follows:

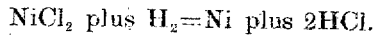
$NiCl_2$ plus $H_2 = Ni$ plus $2HCl$.

This product is then obtained in the shape of metallic nickel ingots of commerce by smelting in an open hearth furnace.

Viewed in the light of current knowledge and without the necessity of further elaboration, the foregoing disclosure will be sufficiently suggestive and otherwise enable those skilled in the art to easily devise certain interchangeably available embodiments and utilizations of this invention which, although perhaps calculated to seem dissimilar in one or more respects, from that herein shown, would nevertheless involve the ideas and utilities which, from the aspect from the prior art, are characteristic of the spirit of this invention and which therefore, should and accordingly are intended to fall within the contemplation of the following claims. I, therefore, desire that all matter in the foregoing disclosure shall be interpreted as purely illustrative and not in a limiting sense, as it will be clear that the various steps and operations herein described may be identified by the use of various more or less arbitrary terms and that the terminology employed is descriptive rather than limiting.

Having described my invention, what I claim as new, and desire to secure by Letters Patent is:

1. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution; then precipitating the iron and cobalt as hydrates; then re-dissolving such hydrates and precipitating the cobalt only; and extracting the nickel from its solution.

2. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates; then re-dissolving such hydrates and precipitating the cobalt only; and extracting the nickel from its solution.

3. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution; then precipitating the iron and cobalt as hydrates; then re-dissolving such hydrates and precipitating the cobalt only; and extracting the nickel from its solution by evaporation and crystallization to obtain $NiCl_2$ and the reducing such salt in a retort with a source of hydrogen.

4. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution; then precipitating the iron and cobalt as hydrates; by treating with a basic salt and a source of chlorin; then re-dissolving such hydrates and precipitating the cobalt only; and extracting the nickel from its solution.

5. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution; then precipitating the iron and cobalt as hydrates; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution.

6. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates; then re-dissolving such hydrates and precipitating the cobalt only; and extracting the nickel from its solution by evaporation and crystallization to obtain $NiCl_2$ and the reducing such salt in a retort with a source of hydrogen.

7. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates by treating with a basic salt and a source of chlorin; then re-dissolving such hydrates and precipitating the cobalt only; and extracting the nickel from its solution.

8. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution.

9. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates by treating with a basic salt and a source of chlorin; then re-dissolving such hydrates and precipitating the cobalt only; and extracting the nickel from its solution, by evaporation and crystallization to obtain $NiCl_2$ and the reducing such salt in a retort with a source of hydrogen.

10. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution by evaporation and crystallization to obtain $NiCl_2$ and the reducing such salt in a retort with a source of hydrogen.

11. A process of the nature disclosed for treating products containing copper, nickel, iron and precious metals together with a relatively small amount of sulfur, consisting in subjecting said product in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates by treating with a basic salt and a source of chlorin; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution by evaporation and crystallization to obtain $NiCl_2$ and then reducing such salt in a retort with a source of hydrogen.

12. A process of the nature disclosed for treating sulfur-bearing ores containing copper, nickel, iron and precious metals consisting in heap-roasting the ore to reduce the sulfur content; then blast-furnace smelting said roasted-ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution, and then treating the residual solution to precipitate the iron and cobalt as hydrates; and then treating the residual solution of nickel chlorid to obtain the nickel therefrom.

13. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates; then re-dissolving such hydrates and precipitating the cobalt only; and extracting the nickel from its solution.

14. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution; then precipitating the iron and cobalt as hydrates; then re-dissolving such hydrates and precipitating the cobalt only; and extracting the nickel from its solution by evaporation and crystallization to obtain $NiCl_2$ and the reducing such salt in a retort with a source of hydrogen.

15. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution; then precipitating with a basic salt and a source of chlorin; then re-dissolving such hydrates and precipitating the cobalt only; and extracting the nickel from its solution.

16. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution; then precipitating the iron and cobalt as hydrates; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution.

17. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates; then re-dissolving such hydrates and precipitating the cobalt only; and extracting the nickel from its solution by evaporation and crystallization to obtain $NiCl_2$ and the reducing such salt in a retort with a source of hydrogen.

18. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates by treating with a basic salt and a source of chlorin; then re-dissolving such hydrates and precipitating the cobalt only; and extracting the nickel from its solution.

19. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution.

20. A process of the nature disclosed for treating sulfur-bearing ores containing copper, nickel, iron and precious metals consisting in heap-roasting the ore to reduce the sulfur into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates by treating with a basic salt and a source of chlorin; then re-dissolving such hydrates and precipitating the cobalt only; and extracting the nickel from its solution, by evaporation and crystallization to obtain $NiCl_2$ and the reducing such salt in a retort with a source of hydrogen.

21. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving out the resultant metallic chlorids in water; then recovering the copper and precious metals from said solution by cementation on scrap iron; then precipitating the iron and cobalt as hydrates; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution by evaporation and crystallization to obtain $NiCl_2$ and the reducing such salt in a retort with a source of hydrogen.

22. A process of the nature disclosed for treating sulfur-bearing ores containing copper, nickel, iron and precious metals consisting in heap-roasting the ore to reduce the sulfur content; then blast-furnace smelting said roasted ore into a matte; then reducing said matte with coke and salt-cake by cupola-smelting and separating out the resultant nickel-bearing matte; then subjecting said matte in crushed form to the action of chlorin gas in closed chambers to volatilize out the sulfur; then dissolving the resultant metallic chlorids in water; then recovering the copper and precious metals from said solution by cementation on scrap iron; then precipitating the iron and cobalt as hydrates by treating with a basic salt and a source of chlorin; then separating the iron and cobalt by re-dissolving and adding a suitable agent exactly predetermined amounts adapted to precipitate the iron only as a hydrate; then re-dissolving such hydrates and precipitating the cobalt only; and extracting the nickel from its solution by evaporation and crystallization to obtain $NiCl_2$ and the reducing such salt in a retort with a source of hydrogen.

In testimony whereof I affix my signature, in the presence of two witnesses.

WOOLSEY McALPINE JOHNSON.

Witnesses:
HENRY H. PEASE,
ALEX. BUNCE.